United States Patent
Patil et al.

(10) Patent No.: US 12,314,693 B2
(45) Date of Patent: May 27, 2025

(54) VISUAL GENERATION OF SOFTWARE DEPLOYMENT PIPELINES USING RECOMMENDATIONS OF DEVELOPMENT AND OPERATIONS BLUEPRINTS

(71) Applicant: Dell Products L.P., Round Rock, TX (US)

(72) Inventors: Rajeev Patil, Bangalore (IN); Afsar Doodekula, Kurnool (IN); Mohan Rao Gadupudi, Telangana (IN); Venkata Chowdary Mutyala, Telangana (IN); Nathan Cairl, Lago Vista, TX (US)

(73) Assignee: Dell Products L.P., Round Rock, TX (US)

( * ) Notice: Subject to any disclaimer, the term of this patent is extended or adjusted under 35 U.S.C. 154(b) by 126 days.

(21) Appl. No.: 17/940,457

(22) Filed: Sep. 8, 2022

(65) Prior Publication Data
US 2024/0086157 A1   Mar. 14, 2024

(51) Int. Cl.
*G06F 8/36* (2018.01)
*G06F 8/10* (2018.01)
*G06F 8/34* (2018.01)

(52) U.S. Cl.
CPC ............ *G06F 8/36* (2013.01); *G06F 8/10* (2013.01); *G06F 8/34* (2013.01)

(58) Field of Classification Search
CPC ..... G06F 8/36; G06F 8/60; G06F 8/65; G06F 8/71
See application file for complete search history.

(56) References Cited

U.S. PATENT DOCUMENTS

2008/0068153 A1   3/2008   Doan et al.
2008/0269938 A1   10/2008  Meaney et al.
(Continued)

OTHER PUBLICATIONS

"A Solution Blueprint for DevOps"; www.Spirent.com; downloaded on Aug. 31, 2022.
(Continued)

*Primary Examiner* — Duy Khuong T Nguyen
(74) *Attorney, Agent, or Firm* — Ryan, Mason & Lewis, LLP

(57) ABSTRACT

Techniques are provided for visual generation of software deployment pipelines using recommendations of development and operations (DevOps) blueprints. One method comprises obtaining information characterizing a technology type and a programming language for a selected software development project; recommending a DevOps blueprint for the selected software development project based on a technology type and a programming language for the selected software development project, wherein the DevOps blueprint comprises reusable software development resources for the technology type and the programming language; providing a graphical interface to present a visual representation of the reusable software development resources; obtaining information characterizing interactions of a user with the graphical user interface to select the reusable software development resources for a pipeline associated with the selected software development project; and automatically generating software code in a target programming language of the DevOps collaboration tool based on the reusable software development resources in the pipeline.

20 Claims, 12 Drawing Sheets

(56) References Cited

U.S. PATENT DOCUMENTS

| | | | |
|---|---|---|---|
| 2015/0113638 A1 | 4/2015 | Valasek et al. | |
| 2018/0205560 A1 | 7/2018 | Park et al. | |
| 2019/0394050 A1 | 12/2019 | Goeringer et al. | |
| 2021/0055917 A1* | 2/2021 | Khakare | G06F 3/0482 |
| 2021/0132935 A1* | 5/2021 | Dinh | G06F 9/4411 |
| 2022/0171840 A1 | 6/2022 | Balin et al. | |
| 2023/0177426 A1* | 6/2023 | Sailer | G06F 8/22 717/102 |

OTHER PUBLICATIONS

"Graphical User Interface Examples"; https://www.conceptdraw.com/How-To-Guide/graphical-user-interface-example; downloaded on Sep. 6, 2022.

"Your Product-Led Experience Builder"; https://www.candu.ai/enterprise?utm_source=google&utm_medium=cpc&utm_campaign=primary_keywords&utm_term=ui%20builder&utm_content=enterprise_page&gclid=Cj0KCQjwjbyYBhCdARIsAArC6LJjfzlqOYhkB-iSz0_ZJuewQ_W1QiE1jN84VieG9V_c-6xsU4thwecaArYoEALw_wcB; downloaded on Aug. 31, 2022.

Chitalov, Dmitri I; "Development of an Application with a Graphical User Interface (GUI) to Compute in Parallel in the OpenFOAM Environment"; https://iopscience.iop.org/article/10.1088/1742-6596/1399/3/033001; downloaded on Aug. 31, 2022.

U.S. Appl. No. 17/210,799 entitled "System Protection Using Verification of Software Digital Identity Values", filed Mar. 24, 2021.

Cooper, David et al. "BIOS Protection Guidelines" https://nvlpubs.nist.gov/nistpubs/Legacy/SP/nistspecialpublication800-147.pdf; downloaded on Sep. 6, 2022.

Hoffman, Chris; "How to Secure Your Computer with a BIOS or UEFI Password"; Updated Jul. 12, 2017; https://www.howtogeek.com/186235/how-to-secure-your-computer-with-a-bios-or-uefi-password/; downloaded on Sep. 6, 2022.

Lewis, Nick; How to Bolster Security to Prevent BIOS Attacks; published Nov. 2011; https://searchsecurity.techtarget.com/answer/How-to-bolster-BIOS-security-to-prevent-BIOS-attacks; downloaded on Sep. 6, 2022.

Rashid, Fahmida Y.; "Dell BIOS Verification Extents Security Focus"; Feb. 5, 2016; https://www.infoworld.com/article/3029728/dell-bios-verification-extends-security-focus.html; downloaded on Sep. 6, 2022.

Mukherjee, Rajdeep; "Hardware Verification Using Software Analyzers"; http://www.kroening.com/papers/ISVLSI2015-1.pdf; downloaded on Sep. 6, 2022.

* cited by examiner

VISUAL GENERATION OF SOFTWARE DEPLOYMENT PIPELINES USING RECOMMENDATIONS OF DEVELOPMENT AND OPERATIONS BLUEPRINTS

FIELD

The field relates generally to information processing systems and more particularly, to software development techniques in such systems.

BACKGROUND

A number of techniques exist for developing and making changes to software code. GitHub, for example, provides a software development platform that enables communication and collaboration among software developers. The software development platform provided by GitHub allows software developers to create new versions of software without disrupting a current version. Software development tasks often require coordination among a number of engineering teams that work on different portions of a larger software development project.

SUMMARY

In one embodiment, a method comprises obtaining information characterizing a technology type and a programming language for a selected software development project; recommending a development and operations blueprint for the selected software development project based at least in part on a technology type and a programming language for the selected software development project, wherein the recommended development and operations blueprint is provided by a development and operations collaboration tool and comprises a plurality of reusable software development resources for the technology type and the programming language; providing a graphical user interface to present a visual representation of at least some of the plurality of reusable software development resources to a user; obtaining information characterizing one or more interactions of the user with the graphical user interface to select a plurality of the visual representations of the reusable software development resources for a software deployment pipeline associated with the selected software development project; and automatically generating software code in a target programming language of the development and operations collaboration tool based at least in part on the selected plurality of visual representations of the reusable software development resources in the software deployment pipeline.

Other illustrative embodiments include, without limitation, apparatus, systems, methods and computer program products comprising processor-readable storage media.

DETAILED DESCRIPTION

Figure 1:
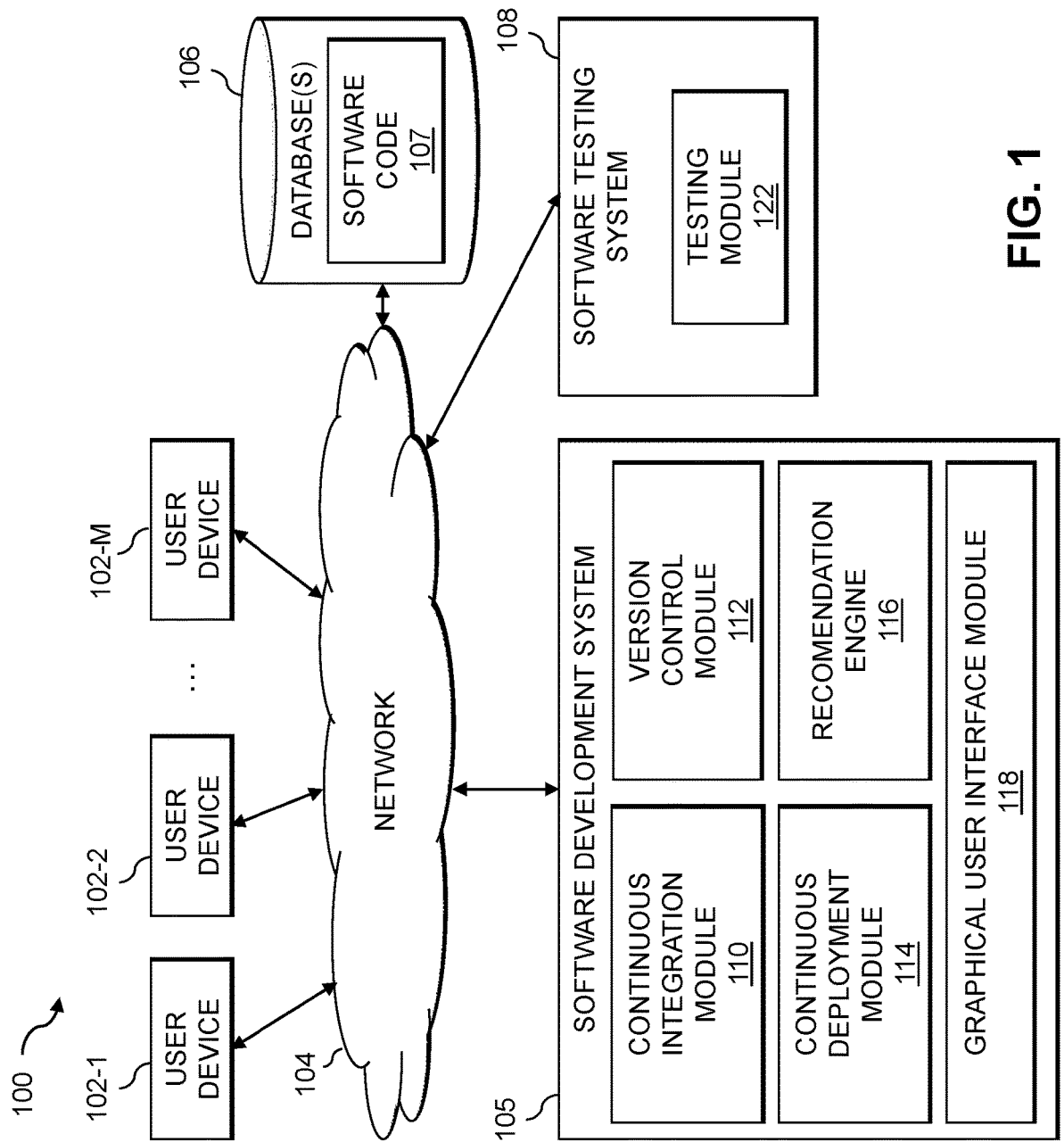
FIG. 1 illustrates an information processing system configured for visual generation of software deployment pipelines using recommendations of development and operations (DevOps) blueprints, in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for visual generation of software deployment pipelines using recommendations of DevOps blueprints.

The term DevOps generally refers to a set of practices that combines software development and information technology (IT) operations. DevOps are increasingly being used to shorten the software development lifecycle and to provide continuous integration, continuous delivery, and continuous deployment. Continuous integration generally allows development teams to merge and verify changes more often by automating software builds (e.g., converting source code files into standalone software components that can be executed on a computing device) and software tests, so that errors can be detected and resolved early. Continuous delivery extends continuous integration and includes efficiently and safely deploying the changes into testing and production environments. Continuous deployment allows code changes that pass an automated testing phase to be automatically released into the production environment, thus making the changes visible to end users. Such processes are typically executed within the build and deployment pipeline.

DevOps solutions typically employ blueprints that encompass continuous integration, continuous testing (CT), continuous deployment (also referred to as continuous development) and/or continuous change and management (CCM) abilities. DevOps blueprints allow development teams to efficiently innovate by automating workflows for a software development and delivery lifecycle. A typical software development lifecycle is discussed further below in conjunction with FIG. 2.

A software deployment pipeline (sometimes referred to as a CI/CD pipeline) automates a software delivery process, and typically comprises a set of automated processes and tools that allow developers and an operations team to work together to generate and deploy application software code to a production environment. A preconfigured software deployment pipeline may comprise a specified set of elements and/or environments. Such elements and/or environments may be added or removed from the software deployment pipeline, for example, based at least in part on the software and/or compliance requirements. A software deployment pipeline typically comprises one or more quality control gates to ensure that software code does not get released to a production environment without satisfying a number of predefined testing and/or quality requirements. For example, a quality control gate may specify that software code should compile without errors and that all unit tests and functional user interface tests must pass.

In at least some embodiments, the software deployment pipelines generated using the disclosed techniques aim to employ automated processes with little, if any, manual steps required as part of, or between, any automated steps of the software deployment pipeline. Human errors may occur when such tasks are performed manually, which may impair the reliability and efficiency of the generated software deployment pipelines. For example, manual implementations are prone to syntax and/or semantic errors, and may increase the time and effort that must be exerted by the software developers.

One or more aspects of the disclosure recognize that CI/CD pipeline instructions are often defined within a YAML (Yet Another Markup Language) file and that software developers must often deal with YAML software code having syntaxes that vary across different DevOps-enabled products and platforms. In addition, it is often difficult for software developers to identify technology-specific reusable components, such as CI/CD jobs, CI/CD templates and DevOps blueprints.

In one or more embodiments of the present disclosure, improved DevOps tools are provided that allow for visual generation of software deployment pipelines using recommendations of DevOps blueprints. Such embodiments allow software developers and other DevOps professionals to reliably and efficiently generate and distribute software deployment pipelines. A software developer can design and generate a software deployment pipeline visually in a user-friendly format, in at least some embodiments, using a graphical user interface, with the appropriate YAML files being generated by the disclosed system automatically. Thus, the software developers do not have to deal with the challenges presented by the YAML programming language.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 may be employed, for example, by software developers and other DevOps professionals to perform, for example, software development and/or software deployment tasks. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a software development system 105 and a software testing system 108.

The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The software development system 105 comprises a continuous integration module 110, a version control module 112, a continuous deployment module 114, a recommendation engine 116 and a graphical user interface (GUI) module 118. Exemplary processes utilizing elements 110, 112, 114, 116 and/or 118 will be described in more detail with reference to, for example, the flow diagrams of FIGS. 2, 6, 7, 9 and 10.

In at least some embodiments, the continuous integration module 110, the version control module 112 and the continuous deployment module 114, or portions thereof, may be implemented using functionality provided, for example, by commercially available DevOps and/or CI/CD tools, such as the GitLab development platform, the GitHub development platform, the Azure DevOps server and/or the Bitbucket CI/CD tool, or another Git-based DevOps and/or CI/CD tool. The continuous integration module 110, the version control module 112 and the continuous deployment module 114 may be configured, for example, to perform CI/CD tasks and to provide access to DevOps tools and/or repositories. The continuous integration module 110 provides functionality for automating the integration of software code changes from multiple software developers or other DevOps professional into a single software project.

In one or more embodiments, the version control module 112 manages canonical schemas (e.g., blueprints, job templates, and software scripts for jobs) and other aspects of the repository composition available from the DevOps and/or CI/CD tool. Source code management (SCM) techniques may be used to track modifications to a source code repository. In some embodiments, SCM techniques are employed to track a history of changes to a software code base and to resolve conflicts when merging updates from multiple software developers.

The continuous deployment module 114 manages the automatic release of software code changes made by one or more software developers from a software repository to a production environment, for example, after validating the stages of production have been completed. The continuous deployment module 114 may interact in some embodiments, with the software testing system 108 to coordinate the testing of software code and/or verify a successful testing of software code.

In at least some embodiments, the recommendation engine 116 may generate recommendations for a blueprint to use as a basis for generating a software deployment pipeline, as well as pipeline stages and pipeline jobs that should be included in a software deployment pipeline for a given technology type and programming language, as discussed further below in conjunction with, for example, FIG. 9. The GUI module 118 may include functionality in some embodiments for the generation and interaction of, for example, a visual CI/CD editor and a reusable CI/CD resource library, as discussed further below in conjunction with FIGS. 3, 4A and 4B.

It is to be appreciated that this particular arrangement of elements 110, 112, 114, 116 and/or 118 illustrated in the software development system 105 of the FIG. 1 embodiment is presented by way of example only, and alternative arrangements can be used in other embodiments. For example, the functionality associated with the elements 110, 112, 114, 116 and/or 118 in other embodiments can be combined into a single module, or separated across a larger number of modules. As another example, multiple distinct processors can be used to implement different ones of the elements 110, 112, 114, 116 and/or 118 or portions thereof.

At least portions of elements 110, 112, 114, 116 and/or 118 may be implemented at least in part in the form of software that is stored in memory and executed by a processor.

The software testing system 108 comprises a testing module 122 that performs one or more software tests within a software deployment pipeline, as would be apparent to a person of ordinary skill in the art. Generally, software testing aims to ensure that bugs and other software code errors are detected as soon as possible and are remedied before being exposed to end-users.

It is to be appreciated that this particular arrangement of the module 122 illustrated in the software testing system 108 of the FIG. 1 embodiment is presented by way of example only, and alternative arrangements can be used in other embodiments. For example, the functionality associated with module 122 in other embodiments can be separated across a larger number of modules and/or multiple distinct processors can be used to implement the functionality associated with module 122, or portions thereof.

Additionally, the software development system 105 and/or the software testing system 108 can have at least one associated database 106 configured to store data pertaining to, for example, software code 107 of at least one application. For example, the at least one associated database 106 may correspond to at least one code repository that stores the software code 107. In such an example, the at least one code repository may include different snapshots or versions of the software code 107, at least some of which can correspond to different branches of the software code 107 used for different development environments (e.g., one or more testing environments, one or more staging environments, and/or one or more production environments).

Also, at least a portion of the one or more user devices 102 can also have at least one associated database (not explicitly shown in FIG. 1). As an example, such a database can maintain a particular branch of the software code 107 that is developed in a sandbox environment associated with a given one of the user devices 102, as discussed further below in conjunction with FIG. 6. Any changes associated with that particular branch can then be sent and merged with branches of the software code 107 maintained in the at least one database 106, for example.

An example database 106, such as depicted in the present embodiment, can be implemented using one or more storage systems associated with the software development system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the software development system 105 are one or more input-output devices, which illustratively comprise keyboards, displays or other types of input-output devices in any combination. Such input-output devices can be used, for example, to support one or more user interfaces to the software development system 105, as well as to support communication between software development system 105 and other related systems and devices not explicitly shown.

Additionally, the software development system 105 and/or the software testing system 108 in the FIG. 1 embodiment are assumed to be implemented using at least one processing device. Each such processing device generally comprises at least one processor and an associated memory, and implements one or more functional modules for controlling certain features of the software development system 105 and/or the software testing system 108.

More particularly, the software development system 105 and/or the software testing system 108 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the software development system 105 and/or the software testing system 108 to communicate over the network 104 with the user devices 102, and illustratively comprises one or more conventional transceivers.

It is to be understood that the particular set of elements shown in FIG. 1 for software development system 105 and the software testing system 108 involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the software development system 105, the software testing system 108 and database(s) 106 can be on and/or part of the same processing platform.

Figure 2:
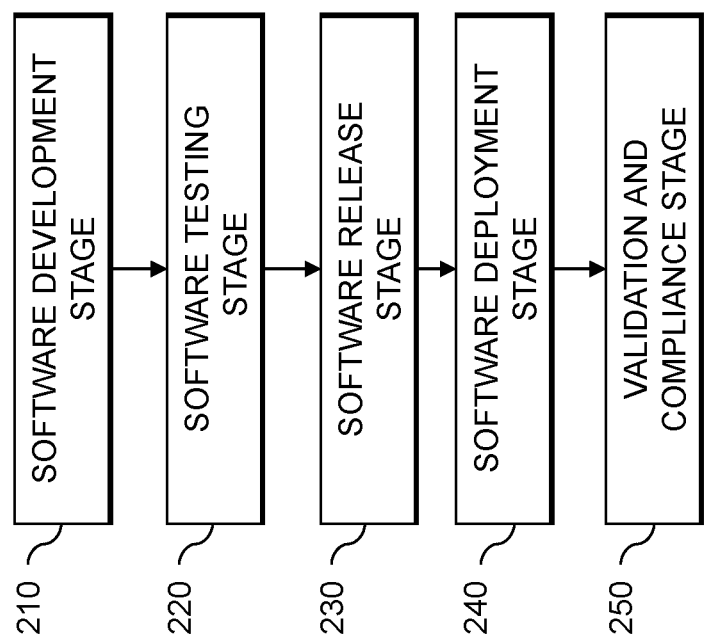
FIG. 2 shows an example of a software development lifecycle in an illustrative embodiment.

FIG. 2 shows an example of a software development lifecycle in an illustrative embodiment. A software development lifecycle is comprised of a number of stages 210 through 250. In the example of FIG. 2, a software development stage 210 comprises generating (e.g., writing) the software code for a given application. A software testing stage 220 tests the application software code. A software release stage 230 comprises delivering the application software code to a repository. A software deployment stage 240 comprises deploying the application software code to a production environment. Finally, a validation and compliance stage 250 comprises the steps to validate a deployment, for example, based at least in part on the needs of a given organization. For example, image security scanning tools may be employed to ensure a quality of the deployed images by comparing them to known vulnerabilities, such as those known vulnerabilities in a catalog of common vulnerabilities and exposures (CVEs).

Figure 3:
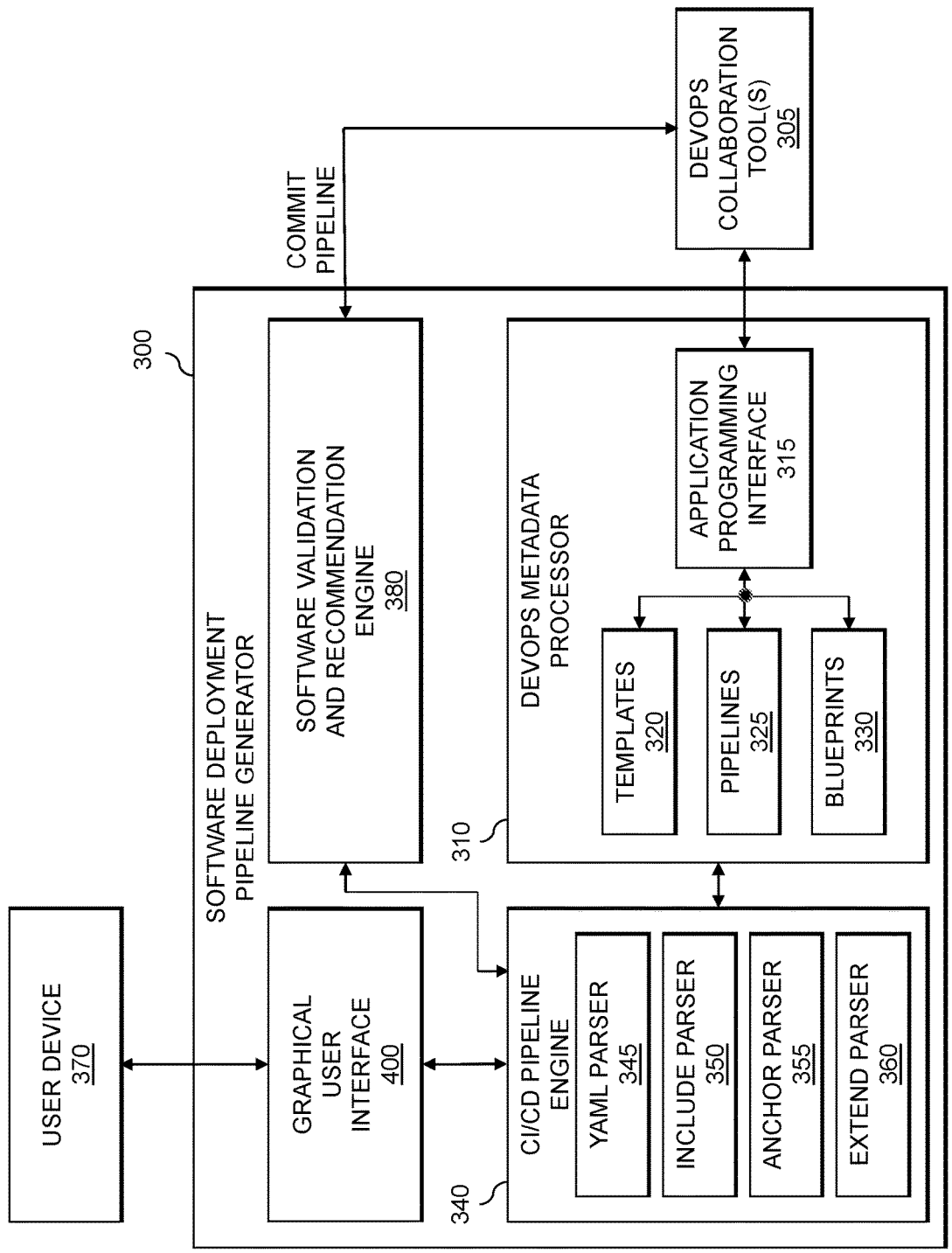
FIG. 3 illustrates a software deployment pipeline generator configured for visual generation of software deployment pipelines using recommendations of DevOps blueprints, in accordance with an illustrative embodiment.

FIG. 3 illustrates a software deployment pipeline generator 300 configured for visual generation of software deployment pipelines using recommendations of DevOps blueprints, in accordance with an illustrative embodiment. As shown in FIG. 3, the software deployment pipeline generator 300 interacts with one or more DevOps collaboration tools 305, in a manner described herein. The DevOps collaboration tools 305 may be implemented at least in part, for example, as one or more of the Git-based DevOps and/or CI/CD tools referenced above in conjunction with the software development system 105 of FIG. 1.

Figures 4A, 4B:
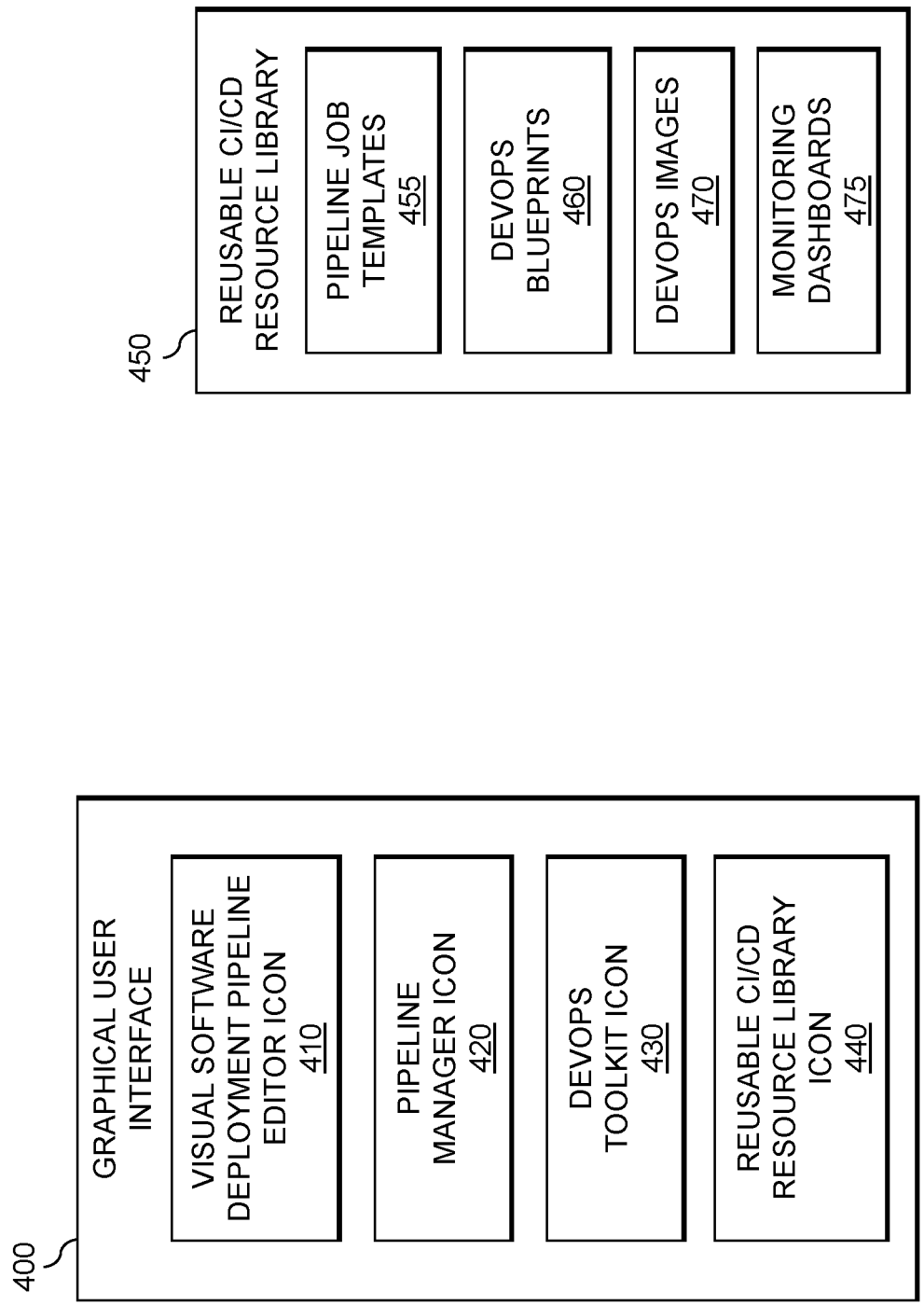
FIG. 4A illustrates the graphical user interface of FIG. 3 in further detail, in accordance with an illustrative embodiment.
FIG. 4B illustrates a reusable continuous integration (CI)/continuous deployment (CD) resource library, in accordance with an illustrative embodiment.

In addition, a user employing a user device 370 utilizes a graphical user interface 400, discussed further below in conjunction with FIG. 4A, provided by the software deployment pipeline generator 300 to interact with one or more visual representations of software deployment pipeline resources provided by a CI/CD pipeline engine 340. Generally, the graphical user interface 400 provides access to a visual software deployment pipeline editor, a pipeline manager, a DevOps toolkit and a reusable CI/CD resource library, as discussed further below.

Upon connecting to one or more of the DevOps collaboration tools 305 for a given project, for example, in response to a selection from the user device 370 of the given project, a DevOps metadata processor 310 accesses the canonical schemas and other aspects of the repository composition available from the DevOps collaboration tools 305 for the given project using an application programming interface 315 (e.g., provided by the respective DevOps collaboration tool 305). In the example of FIG. 3, the DevOps metadata processor 310 obtains templates 320, pipelines 325 and blueprints 330, as discussed further below in conjunction with FIG. 4B.

The CI/CD pipeline engine 340 interacts with the DevOps metadata processor 310 to translate at least some of the templates 320, pipelines 325 and blueprints 330, and potentially additional reusable resources, obtained at least partially from the one or more DevOps collaboration tools 305. In some embodiments, the CI/CD pipeline engine 340 translates the obtained reusable resources into a renderable format, as discussed further below in conjunction with FIG. 5, for a visual presentation to the user device 370 using the graphical user interface 400.

As shown in FIG. 3, the exemplary CI/CD pipeline engine 340 comprises a YAML parser 345, an include parser 350, an anchor parser 355, and an extend parser 360. The YAML parser 345 processes top-level YAML files obtained from one or more of the DevOps collaboration tools 305 for conversion into the renderable format, such as a JSON (JavaScript Object Notation) file format. The include parser 350 processes files referenced in include statements in the YAML file (e.g., whereby a first YAML file calls a second YAML file). The anchor parser 355 processes references in the YAML file, such as variables, images and other configuration items. Finally, the extend parser 360 is employed when an include statement specifies a defined job that a user would like to extend (e.g., to extend or otherwise customize a preconfigured job defined, for example, in a blueprint).

When a user requests to commit a given software deployment pipeline, a software validation and recommendation engine 380 will evaluate the software deployment pipeline for compliance with best practices and other policies. In addition, the software validation and recommendation engine 380 may recommend missing pipeline stages and/or missing pipeline jobs of a given pipeline stage.

FIG. 4A illustrates the graphical user interface 400 of FIG. 3 in further detail, in accordance with an illustrative embodiment. In the example of FIG. 4A, the graphical user interface 400 comprises an icon 410 to access a visual software deployment pipeline editor, an icon 420 to access a pipeline manager, an icon 430 to access a DevOps toolkit and an icon 440 to access a reusable CI/CD resource library 450, as discussed further below in conjunction with FIG. 4B.

In some embodiments, the visual software deployment pipeline editor icon 410 (or another visual indication, such as a tab and/or a menu selection) may provide a user with visual access to a set of available projects, for example, by selecting an "all projects" tab or icon. Upon selecting a given project, a software deployment pipeline creation window can be opened in the graphical user interface 400 to facilitate the creation and/or update of a software deployment pipeline. For example, a user may opt to create a software deployment pipeline using a predefined DevOps blueprint (which may be recommended based on the deployment type and the programming language associated with the selected project, as discussed further below in conjunction with FIG. 9). In other variations, the user may create a software deployment pipeline using a custom blueprint by specifying a path to a storage location of the corresponding file.

The pipeline manager icon 420 (or another visual indication, such as a tab and/or a menu selection) may provide a user with visual access to functionality to perform pipeline operations, such as renaming, reordering, addition and/or deletion of pipeline stages, in coordination with the visual software deployment pipeline editor 410.

The DevOps toolkit icon 430 (or another visual indication, such as a tab and/or a menu selection) may provide a user with visual access to one or more tools provided, for example, by the DevOps collaboration tools 305 of FIG. 3.

The reusable CI/CD resource library icon 440 may provide a user with visual access to a reusable CI/CD resource library 450, as discussed further below in conjunction with FIG. 4B, that comprises a collection of reusable resources that implement and adhere to standards, patterns, policies and/or requirements of a given organization, such as an enterprise organization. For example, the reusable CI/CD resource library 450 may comprise built-in components, such as networking components; templates for deployment of one or more resources (e.g., job templates) and blueprint definitions (e.g., indicating the resources that should be deployed). Each of the components of the reusable CI/CD resource library 450 may be accessed, for example, using corresponding visual icons, tabs and/or menu selections.

In some embodiments, the graphical user interface 400 of FIG. 4A may be organized using tabs or another visual organization method to provide access to pipeline jobs, DevOps blueprints and images of virtual resources. A jobs tab, for example, may display representations of available pipeline jobs from the latest DevOps blueprints, optionally with multiple filters to search for pipeline jobs. Upon selecting a job tile for a particular pipeline job, for example, users can view the metadata associated with the corresponding pipeline job, such as a job description, supported languages, contributors, template data and scripts. A user can insert a particular pipeline job into the software deployment pipeline being developed, for example, by clicking on a (+) button and then selecting an "add to pipeline" option.

A DevOps blueprint tab may display a list of available DevOps blueprints. By selecting a job tile for a particular DevOps blueprint, for example, users can view the pipeline stages of the particular DevOps blueprint and the corresponding pipeline jobs for each pipeline stage, for example, when the user wants to add pipeline jobs from a particular DevOps blueprint into the software deployment pipeline.

A DevOps images tab, for example, may present a catalogue of available DevOps docker images and provide for user discovery of DevOps images using software name and version information.

FIG. 4B illustrates a reusable CI/CD resource library 450, in accordance with an illustrative embodiment. In the example of FIG. 4B, the reusable CI/CD resource library 450 comprises pipeline job templates 455 that display a list of available pipeline job templates from the DevOps collaboration tools 305 (such as test automation templates, database templates, language templates, security templates, cloud templates, and release templates); DevOps Blueprints 460 displaying a list of available DevOps blueprints from the DevOps collaboration tools 305; DevOps images 470 displaying a list of available DevOps images (e.g., for virtualized infrastructure, such as containers and virtual machines) from the DevOps collaboration tools 305; and monitoring dashboards 475 that provide preconfigured functionality for monitoring one or more software deployment pipelines obtained from the DevOps collaboration tools 305. Each of the elements 455, 460, 470, 475 of the reusable CI/CD resource library 450 may be accessed, for example, using corresponding visual icons, tabs and/or menu selections in the graphical user interface 400.

The term "DevOps blueprint," as used herein, (sometimes referred to as "development and operations blueprint") is intended to be broadly construed, so as to encompass, for example, any of a wide variety of arrangements of information characterizing automated implementations of workflows for a software development lifecycle, as would be apparent to a person of ordinary skill in the art.

Figure 5:
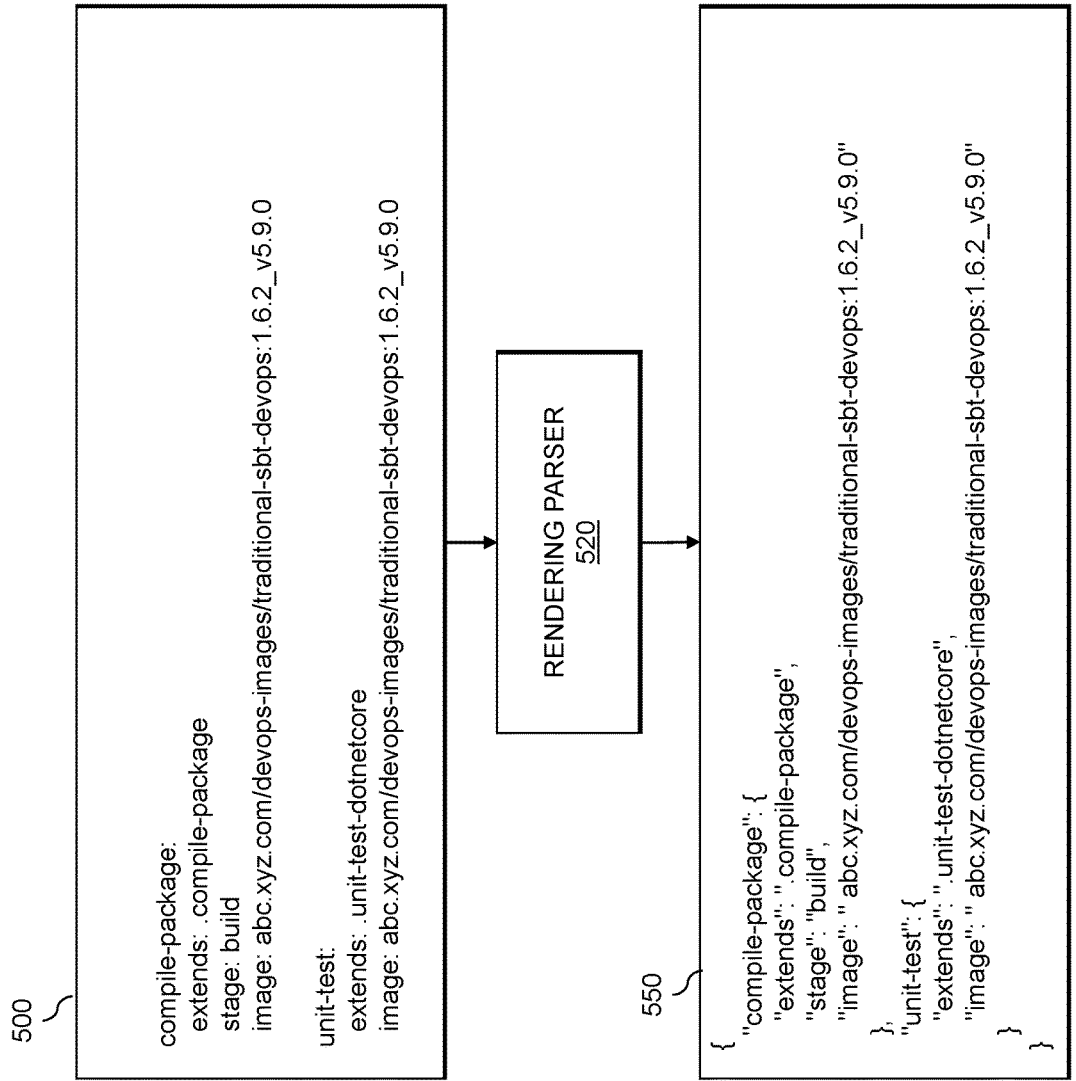
FIG. 5 illustrates an exemplary parsing of an input file in a first programming language to generate a renderable output file in a second programming language, in accordance with an illustrative embodiment.

FIG. 5 illustrates an exemplary parsing of an input file 500 in a first programming language by a rendering parser 520 to generate a renderable output file 550 in a second programming language, in accordance with an illustrative embodiment. The rendering parser 520 parses the input file 500 when the input file 500 is in a format that is difficult to render (or cannot be rendered), such as a YAML, file. Thus, in some embodiments, the rendering parser 520 may be implemented using the YAML parser 345 of FIG. 3.

The rendering parser 520 translates the input file 500 in the first programming language into a renderable output file 550 having a renderable output format, such as a JSON format. In the example of FIG. 5, the rendering parser 520 changes the syntax and formatting of the input file 500 so that the resulting renderable output file 550 can be rendered, for example, by the graphical user interface 400 of FIG. 4A.

Figure 6:
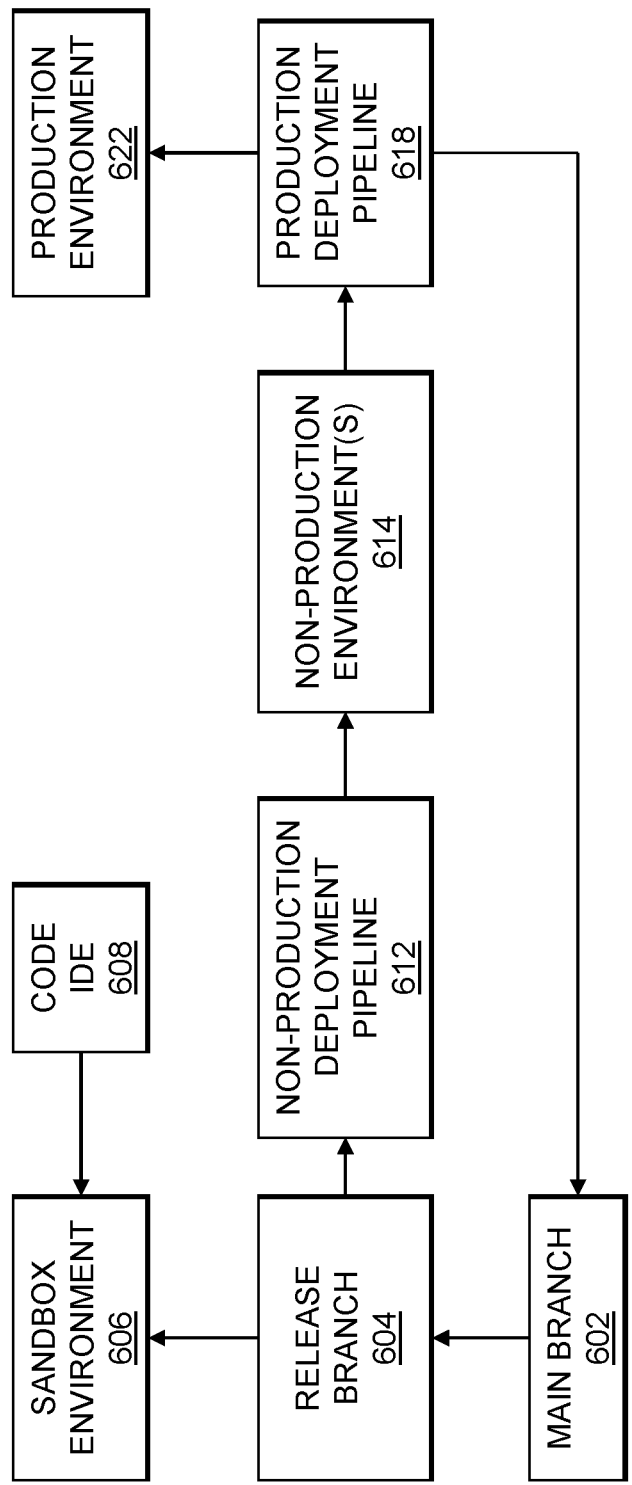
FIG. 6 shows an example of at least portions of the software development lifecycle of FIG. 2 in further detail, in accordance with an illustrative embodiment.

FIG. 6 shows an example of at least portions of the software development lifecycle of FIG. 2 in further detail in an illustrative embodiment. In the FIG. 6 example, a main branch 602 corresponds to software code of at least one software application. A release branch 604 is created based on the main branch 602. For example, the release branch 604 may be created based on development release timelines corresponding to the software application.

One or more developers (e.g., corresponding to user devices 102) create respective personal branches based on the release branch 604, and perform development work using a sandbox environment 606 and a code IDE (integration development environment) 608. Many developers prefer to write software code using such an IDE that allows the software to be developed in any programming language without having to deal with a particular language syntax. Developers may have multiple IDEs available for application development but there is currently no IDE available for writing software deployment pipeline code.

Developers can commit the changes made in their personal branches to the release branch 604. In the FIG. 6 example, a non-production deployment pipeline 612 is triggered according to one or more specified schedules. The non-production deployment pipeline 612 deploys any changes resulting from the change requests to one or more non-production environments 614.

In some examples, the non-production environment(s) 614 may include one or more of: a developer integration testing (DIT) environment, a system integration testing (SIT) environment, and a global environment. As noted above, the non-production deployment pipeline 612 may be triggered according to schedules defined for each of the non-production environments 614 (e.g., a first schedule for a DIT environment and a second schedule for an SIT environment).

A production deployment pipeline 618 can be triggered when the release branch 604 of the application is ready to be deployed to a production environment 622. Generally, the production deployment pipeline 618 collects any changes that were made to the release branch 604, creates a deployment package, and deploys the package to the production environment 622.

Figure 7:
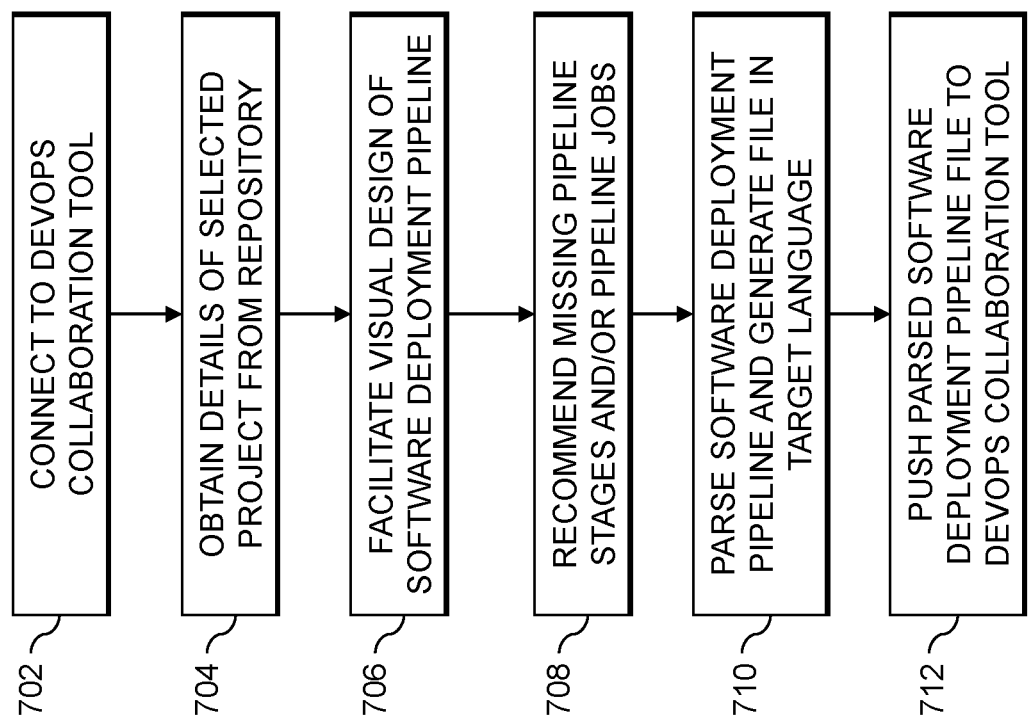
FIG. 7 is a flow chart illustrating a process for generating a software deployment pipeline, in accordance with an illustrative embodiment.

FIG. 7 is a flow chart illustrating a process for generating a software deployment pipeline, in accordance with an illustrative embodiment. In the example of FIG. 7, a user connects to a DevOps collaboration tool 305 in step 702. In step 704, details of a selected project are obtained from a repository of the DevOps collaboration tool 305. For example, the repository composition and other project details may be obtained using the application programming interface 315. In some embodiments, the repository composition includes (or provides access to) a canonical schema, one or more preconfigured CI/CD blueprints, which may include individual job templates, images (e.g., for virtual machines and/or containers), software scripts and other project details available from the DevOps collaboration tool 305, such as a project name, technology type (e.g., a programming language of the application, such as Angular or dotnet (.NET) core) and a deployment type (e.g., whether the application is traditional, infrastructure, cloud-based, virtualized or database deployment).

In step 706, a visual design of a software deployment pipeline is facilitated. For example, the YAML files obtained from the repository, as discussed in conjunction with FIG. 5, for example, can be parsed into a renderable format, so that the graphical user interface 400 can provide visual representations of the obtained reusable resources in the reusable CI/CD resource library 450. The graphical user interface 400 may guide the user to design the software deployment pipeline, for example, in pipeline stages, with the user adding one or more pipeline jobs for each pipeline stage.

In step 708, one or more missing pipeline stages and/or one or more missing pipeline jobs from a given pipeline stage can be recommended to the user, as discussed further below in conjunction with FIG. 9. In this manner, stage-specific recommendations can be provided by recommending one or more pipeline jobs for a given stage. For example, in the software development stage 210, where a software developer is creating or reusing jobs to develop the necessary software code, the software developer can employ the graphical user interface 400 to select and optionally position (e.g., "drag and drop") desired pipeline jobs for the pipeline, and any omitted jobs for the software development stage 210 can be recommended to the user In addition, the recommendations can also be tailored to the specific technology type and deployment type associated with the selected project.

In step 710, the generated software deployment pipeline is parsed and a file is generated in the target programming language of the DevOps collaboration tool 305 (e.g., convert the added pipeline jobs into a YAML format with the required configuration, such as an indication of the corresponding pipeline stage and scripts). In this manner, the disclosed software deployment pipeline generator 300 automatically generates the software code associated with the visual icons selected by the software developer for one or more pipeline stages of the software deployment pipeline, as discussed further below in conjunction with FIG. 8.

In step 712, the parsed software deployment pipeline file is pushed to the DevOps collaboration tool 305.

Figure 8:
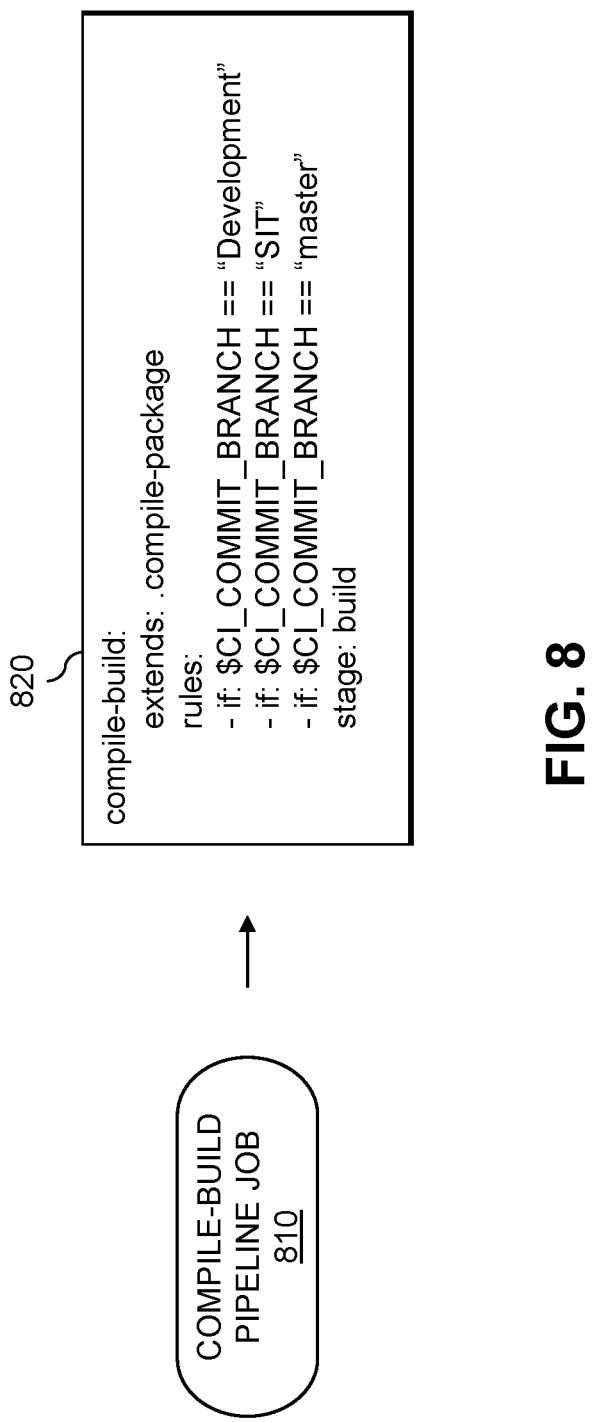
FIG. 8 illustrates a visual icon associated with an exemplary compile-build pipeline job that can be selected for insertion in a software deployment pipeline and the corresponding software script that will be automatically generated in a target format, in accordance with an illustrative embodiment.

FIG. 8 illustrates a visual icon 810 associated with an exemplary compile-build pipeline job that can be selected for insertion in a software deployment pipeline and the corresponding software script 820 that will be automatically generated in a target format of the DevOps collaboration tool 305, in accordance with an illustrative embodiment. In the example of FIG. 8, the compile-build pipeline job associated with the visual icon 810 can be obtained from the repository of the DevOps collaboration tools 305 for a selected project in step 704 of FIG. 7. The visual icon 810 associated with the compile-build pipeline job can be placed in the pipeline job templates 455 of the reusable CI/CD resource library 450 within the graphical user interface 400. The visual icon 810 associated with the exemplary compile-build pipeline job can be selected by a software developer and inserted in a software deployment pipeline under development in step 706 (for example, inserted into the software development stage 210 of the software deployment pipeline).

The corresponding software script 820 will be automatically generated in the target format of the DevOps collaboration tool 305 as part of the parsing of the software deployment pipeline in step 710 of FIG. 7.

Figure 9:
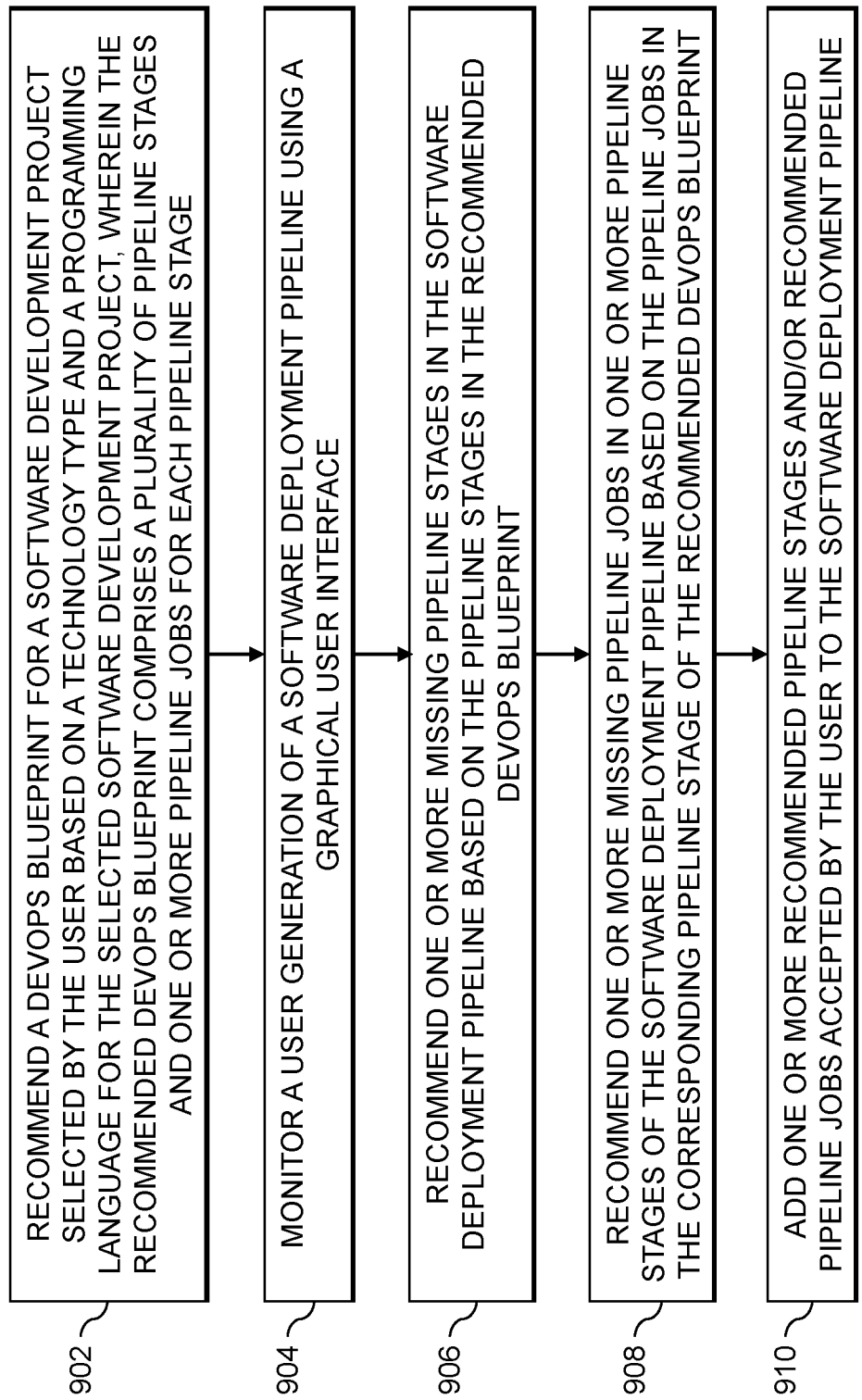
FIG. 9 is a flow chart illustrating a recommendation process for generating recommendations for one or more aspects of a software deployment pipeline, in accordance with an illustrative embodiment.

FIG. 9 is a flow chart illustrating a recommendation process for generating recommendations for one or more aspects of a software deployment pipeline, in accordance with an illustrative embodiment. In the example of FIG. 9, one or more aspects of the disclosure recognize that there is currently no automated mechanism for evaluating whether a software deployment pipeline provides the necessary pipeline stages and the necessary pipeline jobs within each of the necessary pipeline stages factors, and to provides appropriate recommendations to a software developer to address any missing pipeline stages and/or pipeline jobs.

In the example of FIG. 9, a DevOps blueprint is recommended in step 902 for a software development project selected by a user based at least in part on a technology type and a programming language for the selected software development project (and potentially one or more additional criteria), wherein the recommended DevOps blueprint comprises a plurality of pipeline stages and one or more pipeline jobs for each pipeline stage.

In step 904, a user generation of a software deployment pipeline using a graphical user interface 400 is monitored. One or more missing pipeline stages in the software deployment pipeline are recommended in step 906 based at least in part on the pipeline stages in the recommended DevOps blueprint. In step 908, one or more missing pipeline jobs are recommended in one or more of the pipeline stages of the software deployment pipeline based at least in part on the pipeline jobs in the corresponding pipeline stage of the recommended DevOps blueprint.

One or more of the recommended pipeline stages and/or the recommended pipeline jobs that are accepted by the user are added to the software deployment pipeline in step 910.

Figure 10:
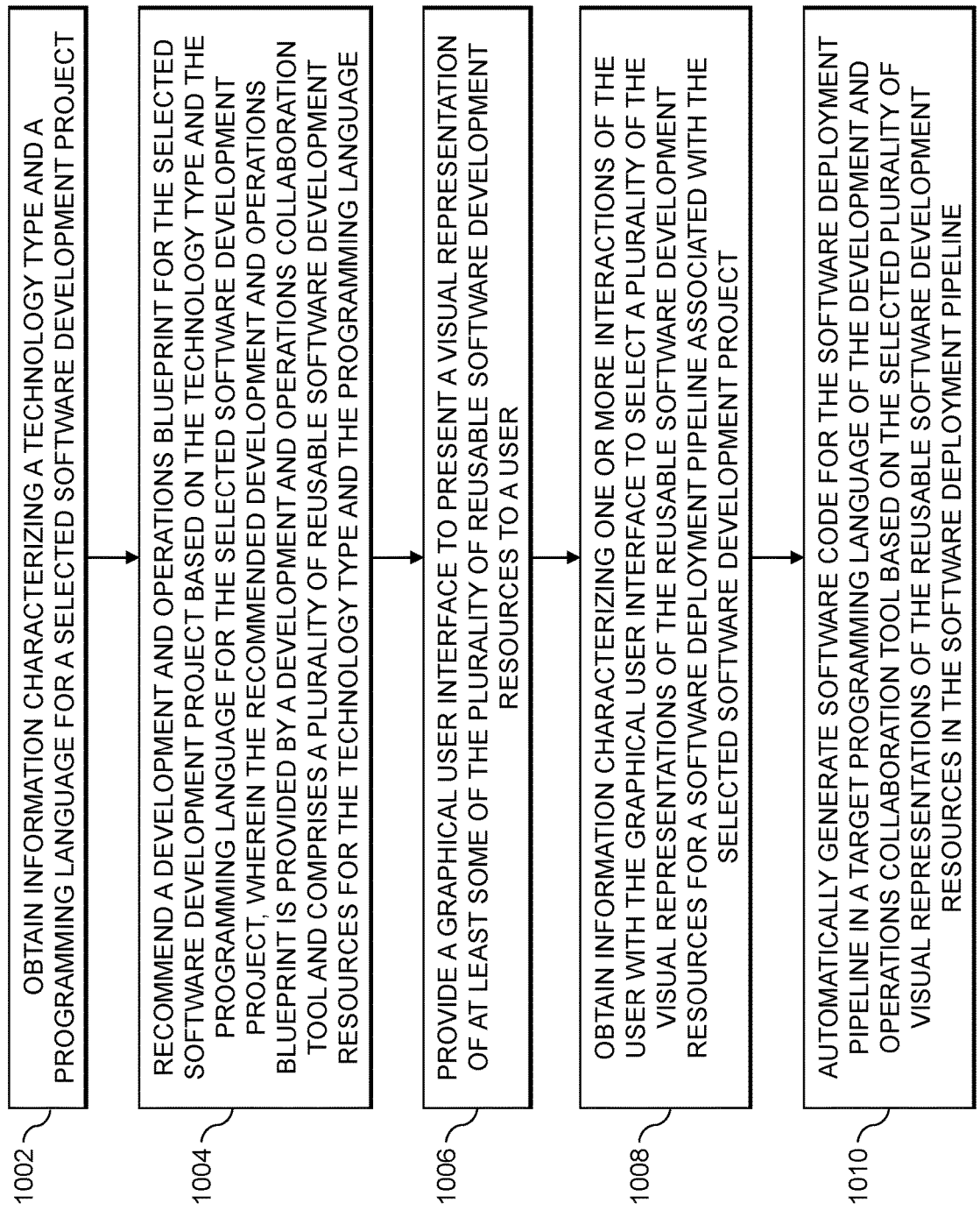
FIG. 10 is a flow chart illustrating an exemplary implementation of a process for visual generation of software deployment pipelines using recommendations of DevOps blueprints, in accordance with an illustrative embodiment.

FIG. 10 is a flow chart illustrating an exemplary implementation of a process for visual generation of software deployment pipelines using recommendations of blueprints, in accordance with an illustrative embodiment. In the example of FIG. 10, information is obtained in step 1002 characterizing a technology type and a programming language for a selected software development project (e.g., selected by a user).

In step 1004, a development and operations blueprint is recommended for the selected software development project based at least in part on the technology type and the programming language associated with the selected software development project, wherein the recommended development and operations blueprint is provided by a development and operations collaboration tool and comprises a plurality of reusable software development resources for the technology type and the programming language.

A graphical user interface is provided in step 1006 to present a visual representation of at least some of the plurality of reusable software development resources to a user. In step 1008, information is obtained characterizing one or more interactions of the user with the graphical user interface to select a plurality of the visual representations of the reusable software development resources for a software deployment pipeline associated with the selected software development project. In one or more embodiments, a user may also specify a positioning of the selected reusable software development resources within a given stage (for example, using a "drag and drop" approach). In other embodiments, an ordering of the selected reusable software development resources within a given stage may not be specified or needed.

In step 1010, software code is automatically generated for the software deployment pipeline in a target programming language of the development and operations collaboration tool based at least in part on the selected plurality of visual representations of the reusable software development resources in the software deployment pipeline.

The particular processing operations and other network functionality described in conjunction with the flow diagrams of FIGS. 2, 6, 7, 9 and 10, for example, are presented by way of illustrative example only, and should not be construed as limiting the scope of the disclosure in any way. Alternative embodiments can use other types of processing operations to provide functionality for graphical-based generation of software deployment pipelines. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In one or more embodiments, one or more missing pipeline stages in the software deployment pipeline are recommended based at least in part on one or more pipeline stages in the recommended development and operations blueprint. One or more missing pipeline jobs in one or more missing pipeline stages in the software deployment pipeline may be recommended based at least in part on one or more pipeline jobs in a corresponding pipeline stage of the recommended development and operations blueprint.

In some embodiments, the plurality of reusable software development resources comprises one or more of: (i) one or more pipeline job templates available from the development and operations collaboration tool; (ii) one or more blueprints available from the development and operations collaboration tool; (iii) one or more virtualized infrastructure images available from the development and operations collaboration tool; and (iv) one or more monitoring dashboards available from the development and operations collaboration tool.

In at least one embodiment, the graphical user interface presents a plurality of software development projects to the user, and in response to the user selecting the selected software development project from the plurality of software development projects, the graphical user interface presents a software deployment pipeline creation window to the user to process the software deployment pipeline. In addition, the graphical user interface may provide functionality to perform one or more of: renaming a pipeline stage, reordering a pipeline stage, adding a pipeline stage and deleting a pipeline stage. The graphical user interface may also provide visual access to the user to one or more tools provided by the development and operations collaboration tool.

One or more files obtained from the development and operations collaboration tool in a first file format may be parsed into a second file format that is renderable by the graphical user interface.

A compliance evaluation of the software deployment pipeline may be performed in response to a user request to commit the software deployment pipeline.

Among other benefits, the disclosed techniques for visual generation of software deployment pipelines (i) allow a software developer to more efficiently design and generate a software deployment pipeline visually in a user-friendly format, using a graphical user interface, and (ii) ensure code uniformity among developers. In this manner, the disclosed techniques allow software developers and other DevOps professionals to reliably and efficiently generate and distribute software deployment pipelines. In at least some embodiments, the software developers thus do not have to deal with the challenges presented by the programming language of the DevOps collaboration tool (e.g., YAML).

Upon completion of a given software deployment pipeline, the corresponding software code can be automatically generated in a target programming language of the DevOps collaboration tool using the reusable resources selected for the software deployment pipeline.

In addition, while one or more exemplary embodiments implement at least portions of the disclosed functionality for graphical-based generation of software deployment pipelines in the software deployment pipeline generator 300, in one or more alternate embodiments, at least a portion of the disclosed functionality for graphical-based generation of software deployment pipelines may be implemented directly in one or more of the DevOps collaboration tools 305, software development system 105 or on another device.

It should also be understood that the disclosed techniques for visual generation of software deployment pipelines using recommendations of development and operations blueprints can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for visual generation of software deployment pipelines using recommendations of development and operations blueprints may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services and/or storage services can be offered to cloud infrastructure tenants or other system users as a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based graphical software deployment pipeline generation engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a graphical software deployment pipeline generation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container. The containers may run on virtual machines in a multi-tenant environment, although other arrangements are possible. The containers may be utilized to implement a variety of different types of functionalities within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 11 and 12. These platforms may also be used to implement at least portions of other information processing systems in other embodiments.

Figure 11:
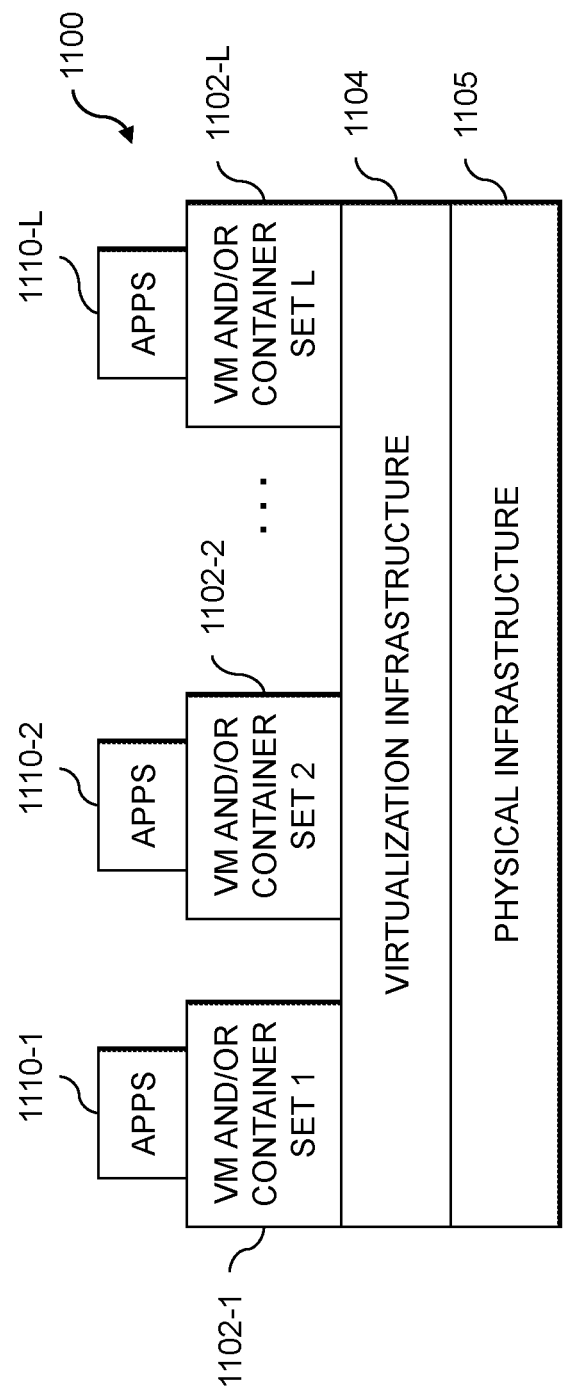
FIG. 11 illustrates an exemplary processing platform that may be used to implement at least a portion of one or more embodiments of the disclosure comprising a cloud infrastructure.

FIG. 11 shows an example processing platform comprising cloud infrastructure 1100. The cloud infrastructure 1100 comprises a combination of physical and virtual processing resources that may be utilized to implement at least a portion of the information processing system 100. The cloud infrastructure 1100 comprises multiple VMs and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. Such implementations can provide graphical software deployment pipeline generation functionality of the type described above for one or more processes running on a given one of the VMs. For example, each of the VMs can implement graphical software deployment pipeline generation control logic and associated software deployment pipeline recommendation functionality for one or more processes running on that particular VM.

An example of a hypervisor platform that may be used to implement a hypervisor within the virtualization infrastructure 1104 is the VMware® vSphere® which may have an associated virtual infrastructure management system such as the VMware® vCenter™. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system. Such implementations can provide graphical software deployment pipeline generation functionality of the type described above for one or more processes running on different ones of the containers. For example, a container host device supporting multiple containers of one or more container sets can implement one or more instances of graphical software deployment pipeline generation control logic and associated software deployment pipeline recommendation functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises at least a portion of the given system and includes a plurality of processing devices, denoted 1202-1, 1202-2, 1202-3, . . . 1202-K, which communicate with one another over a network 1204. The network 1204 may comprise any type of network, such as a WAN, a LAN, a satellite network, a telephone or cable network, a cellular network, a wireless network such as WiFi or WiMAX, or various portions or combinations of these and other types of networks.

The processing device 1202-1 in the processing platform 1200 comprises a processor 1210 coupled to a memory 1212. The processor 1210 may comprise a microprocessor, a microcontroller, an ASIC, an FPGA or other type of processing circuitry, as well as portions or combinations of such circuitry elements, and the memory 1212, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and the given system may include additional or alternative processing platforms, as well as numerous distinct processing platforms in any combination, with each such platform comprising one or more computers, storage devices or other processing devices.

Figure 12:
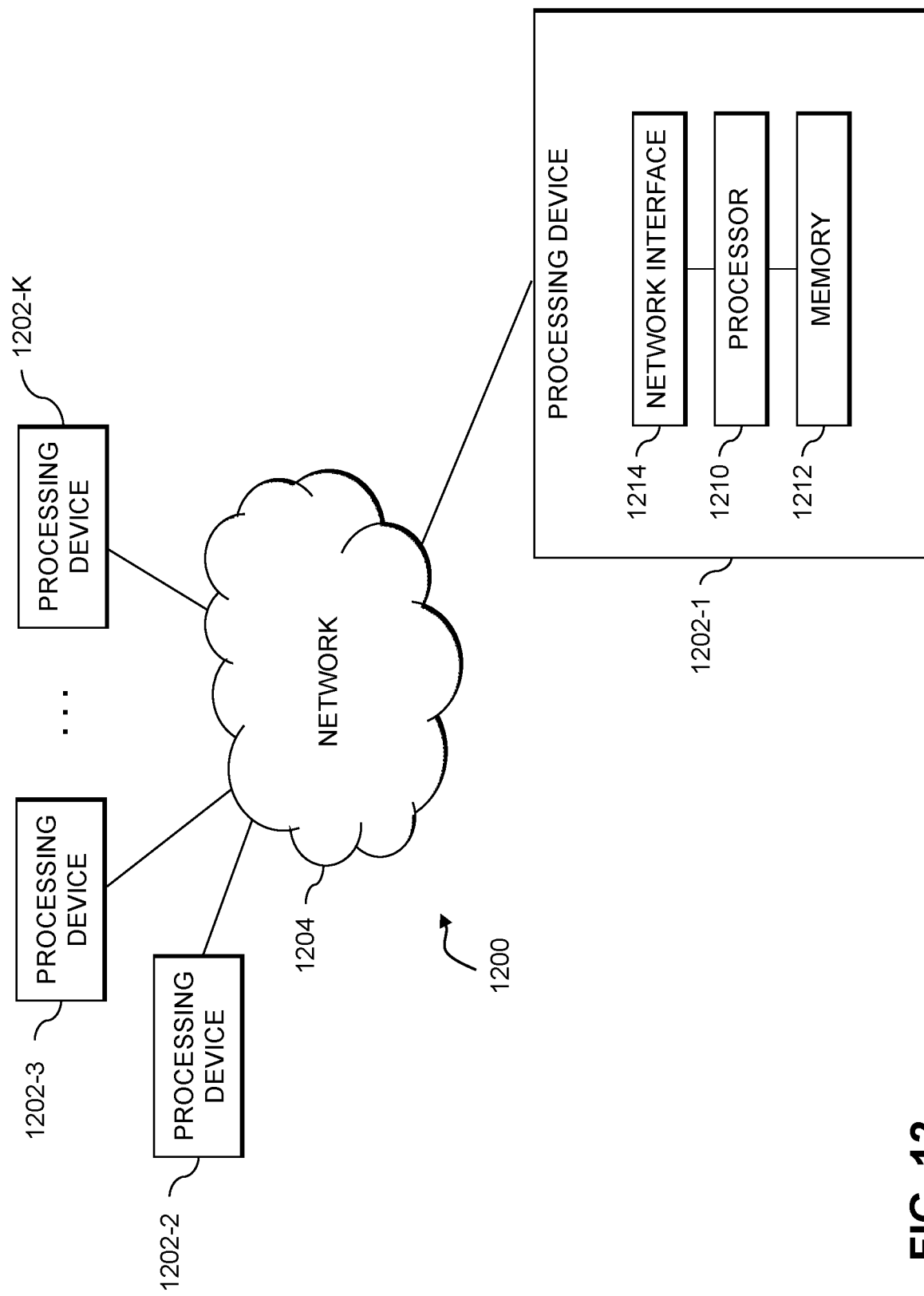
FIG. 12 illustrates another exemplary processing platform that may be used to implement at least a portion of one or more embodiments of the disclosure.

Multiple elements of an information processing system may be collectively implemented on a common processing platform of the type shown in FIG. 11 or 12, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining information characterizing a technology type and a programming language for a selected software development project;
   recommending a development and operations blueprint for the selected software development project based at least in part on the technology type and the programming language for the selected software development project, wherein the recommended development and operations blueprint is provided by a development and operations collaboration tool and comprises a plurality of reusable software development resources for the technology type and the programming language;
   providing a graphical user interface to present a visual representation of at least some of the plurality of reusable software development resources to a user;
   obtaining information characterizing one or more interactions of the user with the graphical user interface to select a plurality of the visual representations of the reusable software development resources for a software deployment pipeline associated with the selected software development project, wherein the user specifies a position, using the graphical user interface, of at least one of the selected visual representations of the plurality of reusable software development resources within one or more designated pipeline stages of the software deployment pipeline; and
   automatically generating software code in a target programming language of the development and operations collaboration tool based at least in part on the selected plurality of visual representations of the reusable software development resources in the software deployment pipeline;
   wherein the method is performed by at least one processing device comprising a processor coupled to a memory.

2. The method of claim 1, further comprising recommending one or more missing pipeline stages in the software deployment pipeline based at least in part on one or more pipeline stages in the recommended development and operations blueprint.

3. The method of claim 1, further comprising recommending one or more missing pipeline jobs in one or more pipeline stages in the software deployment pipeline based at least in part on one or more pipeline jobs in a corresponding pipeline stage of the recommended development and operations blueprint.

4. The method of claim 1, wherein the plurality of reusable software development resources comprises one or more of: (i) one or more pipeline job templates available from the development and operations collaboration tool; (ii) one or more blueprints available from the development and operations collaboration tool; (iii) one or more virtualized infrastructure images available from the development and operations collaboration tool; and (iv) one or more monitoring dashboards available from the development and operations collaboration tool.

5. The method of claim 1, wherein the graphical user interface presents a plurality of software development projects to the user, and in response to the user selecting the selected software development project from the plurality of software development projects, the graphical user interface presents a software deployment pipeline processing window to the user to process the software deployment pipeline.

6. The method of claim 1, wherein the graphical user interface provides functionality to perform one or more of: renaming, reordering, adding and deleting a pipeline stage of the software deployment pipeline.

7. The method of claim 1, wherein the graphical user interface provides visual access to one or more tools provided by the development and operations collaboration tool.

8. The method of claim 1, further comprising parsing one or more files obtained from the development and operations collaboration tool in a first file format into a second file format that is renderable by the graphical user interface.

9. The method of claim 1, further comprising performing a compliance evaluation of the software deployment pipeline in response to a user request to commit the software deployment pipeline.

10. The method of claim 1, wherein the programming language for the selected software development project is different than the target programming language.

11. The method of claim 1, wherein the user specifies a position, using the graphical user interface, of at least one selected pipeline job in one or more designated pipeline stages of the software deployment pipeline.

12. An apparatus comprising:
at least one processing device comprising a processor coupled to a memory;
the at least one processing device being configured to implement the following steps:
obtaining information characterizing a technology type and a programming language for a selected software development project;
recommending a development and operations blueprint for the selected software development project based at least in part on the technology type and the programming language for the selected software development project, wherein the recommended development and operations blueprint is provided by a development and operations collaboration tool and comprises a plurality of reusable software development resources for the technology type and the programming language;
providing a graphical user interface to present a visual representation of at least some of the plurality of reusable software development resources to a user;
obtaining information characterizing one or more interactions of the user with the graphical user interface to select a plurality of the visual representations of the reusable software development resources for a software deployment pipeline associated with the selected software development project, wherein the user specifies a position, using the graphical user interface, of at least one of the selected visual representations of the plurality of reusable software development resources within one or more designated pipeline stages of the software deployment pipeline; and
automatically generating software code in a target programming language of the development and operations collaboration tool based at least in part on the selected plurality of visual representations of the reusable software development resources in the software deployment pipeline.

13. The apparatus of claim 12, further comprising recommending one or more missing pipeline stages in the software deployment pipeline based at least in part on one or more pipeline stages in the recommended development and operations blueprint.

14. The apparatus of claim 12, further comprising recommending one or more missing pipeline jobs in one or more pipeline stages in the software deployment pipeline based at least in part on one or more pipeline jobs in a corresponding pipeline stage of the recommended development and operations blueprint.

15. The apparatus of claim 12, wherein the plurality of reusable software development resources comprises one or more of: (i) one or more pipeline job templates available from the development and operations collaboration tool; (ii) one or more blueprints available from the development and operations collaboration tool; (iii) one or more virtualized infrastructure images available from the development and operations collaboration tool; and (iv) one or more monitoring dashboards available from the development and operations collaboration tool.

16. A non-transitory processor-readable storage medium having stored therein program code of one or more software programs, wherein the program code when executed by at least one processing device causes the at least one processing device to perform the following steps:
obtaining information characterizing a technology type and a programming language for a selected software development project;
recommending a development and operations blueprint for the selected software development project based at least in part on the technology type and the programming language for the selected software development project, wherein the recommended development and operations blueprint is provided by a development and operations collaboration tool and comprises a plurality of reusable software development resources for the technology type and the programming language;
providing a graphical user interface to present a visual representation of at least some of the plurality of reusable software development resources to a user;
obtaining information characterizing one or more interactions of the user with the graphical user interface to select a plurality of the visual representations of the reusable software development resources for a software deployment pipeline associated with the selected software development project, wherein the user specifies a position, using the graphical user interface, of at least one of the selected visual representations of the plurality of reusable software development resources within one or more designated pipeline stages of the software deployment pipeline; and
automatically generating software code in a target programming language of the development and operations collaboration tool based at least in part on the selected plurality of visual representations of the reusable software development resources in the software deployment pipeline.

17. The non-transitory processor-readable storage medium of claim 16, further comprising recommending one or more missing pipeline stages in the software deployment pipeline based at least in part on one or more pipeline stages in the recommended development and operations blueprint.

18. The non-transitory processor-readable storage medium of claim 16, further comprising recommending one or more missing pipeline jobs in one or more pipeline stages in the software deployment pipeline based at least in part on one or more pipeline jobs in a corresponding pipeline stage of the recommended development and operations blueprint.

19. The non-transitory processor-readable storage medium of claim 16, wherein the plurality of reusable software development resources comprises one or more of:

(i) one or more pipeline job templates available from the development and operations collaboration tool; (ii) one or more blueprints available from the development and operations collaboration tool; (iii) one or more virtualized infrastructure images available from the development and operations collaboration tool; and (iv) one or more monitoring dashboards available from the development and operations collaboration tool.

20. The non-transitory processor-readable storage medium of claim 16, further comprising parsing one or more files obtained from the development and operations collaboration tool in a first file format into a second file format that is renderable by the graphical user interface.

* * * * *